US008976834B2

(12) United States Patent
Kaster et al.

(10) Patent No.: US 8,976,834 B2
(45) Date of Patent: Mar. 10, 2015

(54) METHOD OF GENERATING ENHANCED INTRA-RESONATOR LASER LIGHT, ENHANCEMENT RESONATOR AND LASER DEVICE

(75) Inventors: Jan Kaster, Munich (DE); Ioachim Pupeza, Munich (DE); Ernst Fill, Garching (DE); Ferenc Krausz, Garching (DE)

(73) Assignee: Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 77 days.

(21) Appl. No.: 13/821,003

(22) PCT Filed: Sep. 6, 2010

(86) PCT No.: PCT/EP2010/005464
§ 371 (c)(1),
(2), (4) Date: Apr. 25, 2013

(87) PCT Pub. No.: WO2012/031607
PCT Pub. Date: Mar. 15, 2012

(65) Prior Publication Data
US 2013/0215925 A1 Aug. 22, 2013

(51) Int. Cl.
*H01S 3/08* (2006.01)
*H01S 3/00* (2006.01)
*H05G 2/00* (2006.01)

(52) U.S. Cl.
CPC ........... *H01S 3/08059* (2013.01); *H01S 3/0057* (2013.01); *H01S 3/0092* (2013.01); *H05G 2/00* (2013.01)
USPC .................................. 372/98; 372/92; 372/99

(58) Field of Classification Search
USPC ............................................... 372/98, 92, 99
See application file for complete search history.

(56) References Cited

U.S. PATENT DOCUMENTS 3,001,448 A 9/1961 Day
(Continued)

FOREIGN PATENT DOCUMENTS

| EP | 2083319 A1 | 7/2009 |
| WO | 2011060805 A1 | 5/2011 |
| WO | 2011139303 A2 | 11/2011 |

OTHER PUBLICATIONS

Bilger et al., "Origins of Fundamental Limits for Reflection Losses at Multilayer Dielectric Mirrors", Applied Optics, vol. 33, No. 31, pp. 7390-7396 (1994).
(Continued)

*Primary Examiner* — Armando Rodriguez
(74) *Attorney, Agent, or Firm* — Caesar, Rivise, Bernstein, Cohen & Pokotilow, Ltd.

(57) ABSTRACT

A method of generating intra-resonator laser light (1) comprises the steps of coupling input laser light (2), e. g. laser pulse or continuous-wave light, into an enhancement resonator (20), which comprises at least two curved resonator mirrors (21, 22, 23, 24) and which is free of a laser light amplifying medium, said at least two curved resonator mirrors (21, 22, 23, 24) being consecutively arranged and spanning at least one resonator path with a predetermined resonator length (Lres), wherein said at least two curved resonator mirrors (21, 22, 23, 24) providing at least two pairs of consecutive curved resonator mirrors which are serially coupled along said at least one resonator path, and coherent addition of the input laser light (2) in the enhancement resonator so that the intra-resonator laser light (1) is formed, wherein said at least two pairs of consecutive curved resonator mirrors each have a detuned concentric configuration, which deviates from a concentric configuration with regard to at least one of a distance between the curved mirrors, and an angle of incidence on the curved mirror surfaces. Furthermore, an enhancement resonator (20), in particular being configured for generating intra-resonator laser light (1), a laser device (100) including the enhancement resonator device (20) and applications of the enhancement resonator device (20) are described.

51 Claims, 4 Drawing Sheets

(56) References Cited

U.S. PATENT DOCUMENTS

| | | | |
|---|---|---|---|
| 4,932,768 | A | 6/1990 | Gobeli |
| 5,052,017 | A | 9/1991 | Hobart et al. |
| 5,247,562 | A * | 9/1993 | Steinbach .................. 378/119 |
| 5,432,610 | A | 7/1995 | King et al. |
| 5,710,788 | A | 1/1998 | Werner |
| 6,038,055 | A | 3/2000 | Hansch et al. |
| 6,226,354 | B1 | 5/2001 | Mamine |
| 7,277,526 | B2 | 10/2007 | Rifkin et al. |
| 7,295,653 | B2 | 11/2007 | Loewen et al. |
| 7,812,949 | B2 | 10/2010 | Delmas et al. |
| 2005/0134836 | A1 | 6/2005 | Paldus et al. |
| 2005/0254534 | A1 | 11/2005 | Loewen et al. |
| 2005/0271185 | A1 | 12/2005 | Loewen et al. |
| 2006/0268949 | A1 | 11/2006 | Gohle et al. |
| 2011/0073784 | A1 | 3/2011 | Kartner et al. |
| 2011/0140009 | A1 | 6/2011 | Kaertner et al. |
| 2012/0188661 | A1 | 7/2012 | Demmer |

OTHER PUBLICATIONS

Black, "An Introduction to Pound-Drever-Hall Laser Frequency Stabilization", Am. J. Phys., vol. 69, No. 1, pp. 79-87 (2001).

Clayton et al., "Application of Conventional Laser Technology to Gamma-Gamma Colliders", Nuclear Instruments and Methods in Physics Research, Section A, vol. 355, pp. 121-129, Elsevier Science B.V., (1995).

Ditmire et al., "Interaction of Intense Laser Pulses with Atomic Clusters", Physical Review A, vol. 53, No. 5, pp. 3379-3402, The American Physical Society, (1996).

Hald, "Second Harmonic Generation in an External Ring Cavity with a Brewster-Cut Nonlinear Crystal: Theoretical Considerations", Optics Communications, vol. 197, pp. 169-173 (2001).

Jones et al., "Passive Optical Amplifier for Picosecond and Femtosecond Pulses", Quantum Electronics and Laser Science, Qels. Postconference Dige St., pp. 452-454, Optical Society of America, Jun. 1-6, 2003.

Jones et al., "Phase-Coherent Frequency Combs in the Vacuum Ultraviolet via High-Harmonic Generation Inside a Femtosecond Enhancement Cavity", PRL, vol. 94, pp. 193201-193201-4, The American Physical Society, (2005).

Pupeza, et al., "Power Scaling of a High-Repetition-Rate Enhancement Cavity", Optics Letters, vol. 35, No. 12, Jun. 15, 2010.

Sakaue et al., "Observation of Pulsed X-ray Trains Produced by Laser-Electron Compton Scatterings", Review of Scientific Instruments, vol. 80, pp. 123304-1-123304-7, American Institute of Physics, (2009).

Theuer et al., "Terahertz Generation in an Actively Controlled Femtosecond Enhancement Cavity", Applied Physics Letters, vol. 93, pp. 041119-1-041119-3, American Institute of Physics, (2008).

Vidne et al., "Pulse Picking by Phase-Coherent Additive Pulse Generation in an External Cavity", Optics Letters, vol. 28, No. 23, pp. 2396-2398, Optical Society of America, (2003).

Wang et al., "1.5 um Diode Laser-Based Nonlinear Frequency Conversions by Using Potassium Titanyl Phosphate", Appl. Phys. Lett., vol. 61, No. 16, pp. 1886-1888, American Institute of Physics, (1992).

International Search Report for PCT/EP2010/005464 dated May 18, 2011.

* cited by examiner

METHOD OF GENERATING ENHANCED INTRA-RESONATOR LASER LIGHT, ENHANCEMENT RESONATOR AND LASER DEVICE

FIELD OF THE INVENTION

The invention relates to a method of generating intra-resonator laser light by coherent addition of laser light in an enhancement resonator (enhancement cavity). Furthermore, the invention relates to an enhancement resonator configured for generating intra-resonator laser light by coherent addition of laser light, e. g. pulsed laser light or continuous-wave (cw) laser light. Furthermore, the invention relates to a laser device comprising a laser source device and the enhancement resonator. Applications of the invention are available in particular in the technical fields of generating coherent or non-coherent XUV, soft and hard X-ray or THz radiation by interaction of laser light stored inside the enhancement resonator e. g. with atomic or molecular beams, each either of a clustered or non-clustered structure of the beam constituents, or bunches of relativistic electrons. The generated radiation can be used in particular for laser spectroscopy (e. g. pump-probe-experiments), imaging, interferometry and holography.

TECHNICAL BACKGROUND

Generating XUV or X-Ray radiation with sufficient photon fluxes for the applications named above on the basis of an interaction of laser light with a target like electron bunches or atomic clusters requires on one hand high average and preferably even higher peak powers and on the other hand high photon flux densities, as the efficiency of the XUV/X-Ray generation process is low (depending on the target, e. g. $10^{-6}$). High photon flux densities can be provided with laser light generated by active amplification or by coherent addition in a passive resonator device (see e. g. C. E. Clayton et al., "Nuclear Instruments and Methods in Physics Research A" vol. 355, 1995, p. 121-129./R. J. Jones et al., "Phys. Rev. Lett." vol. 94, 2005, p. 193201-1 to 193201-4, or US 2006/0268949 A1).

Coherent addition of laser light in a passive resonator device (resonator device without amplifying medium, enhancement resonator) is described e. g. in U.S. Pat. No. 6,038,055 or by Y. Vidne et al. in "Optics Letters" vol. 28, 2003, p. 2396-2398. Laser light is coupled into an optical resonator device comprising at least two resonator mirrors in standing wave geometry, at least three resonator mirrors which are arranged with a ring geometry or at least four resonator mirrors in a bow tie ring configuration. The resonator device forms a light path having a resonator length, which is adjusted such that input laser light coupled into the optical resonator device interferes constructively with the intra-resonator laser light to form high power intra-resonator laser light.

The conventional generation of laser light using an enhancement resonator has limitations in terms of power and photon flux density. If conventional resonator mirrors having a reflectivity of 99.9% corresponding to a reflectivity loss of 1000 ppm are used, an arrangement of e. g. four resonator mirrors yields a complete loss of at least 4000 ppm and a corresponding limit of the theoretically possible enhancement. If tuned dielectric resonator mirrors (as described e. g. by H. R. Bilger et al., "Appl. Opt." vol. 33, 1994, p. 7390-7396) having a reflectivity loss of only 30 ppm to 100 ppm are used, the intra-resonator power enhancement can be increased up to e. g. 1000. However, there is still a limitation as to the stored laser light photon flux density on the mirrors. Optical nonlinearities in mirror coatings and impurities on mirror surfaces may yield additional losses, the later e. g. by locally increased temperatures leading to destruction of the mirror surface in the form of microscopic burning spots. Furthermore, impurities, burning spots and particles on the mirror surface induce scattering losses and thermal lensing effects yield average power dependent wavefront distortions. Therefore, the conventional laser light generation employing an enhancement resonator is limited to an average power below 80 kW. As an example, I. Pupeza et al. ("Optics Letters" vol. 35, p. 2052-2054 (2010)) report on an average power of 72 kW. However, for some applications, the generation of XUV/X-Ray or THz radiation based on an interaction of laser pulses, e. g. with bunches of relativistic electrons or atomic clusters, may require a peak photon flux density in the range of $10^{15}$ W/cm$^2$ to $10^{16}$ W/cm$^2$; thus demanding intra-resonator values of an average power of several 100 kW up to two MW, an 1/e$^2$ focal radius of the photon flux density below 25 µm and a pulse duration below 250 fs.

The interaction of the stored laser light with a target can be provided at at least one location within the enhancement resonator. For obtaining high and finely adjustable photon flux densities, the target is supplied in the vicinity of a focal position between a pair of spherical mirrors being arranged with a distance L (optical length at the central frequency of the laser light between the intersections of the laser light path with the two mirror surfaces) and each having a radius of curvature R. In a conventional enhancement resonator the 1/e$^2$ beam radius of the photon flux density on the mirrors is about 500 µm, resulting in a high photon flux density on the mirror surface yielding nonlinear response and damages above a critical photon flux density threshold.

PCT/EP2009/008278 (unpublished on the priority date of the present specification) discloses a method of generating high power laser light, wherein the resonator mirrors are irradiated by the at least one laser light pulse circulating in the enhancement resonator with oblique incidence. Due to the oblique incidence, the area irradiated by the laser beam on the resonator mirror surfaces is increased, thus the photon flux density on the mirror surfaces is decreased. However, this technique may have disadvantages as providing the oblique incidence may require a complex mirror and mirror positioning design.

Another general disadvantage of conventional techniques using the generation of coherent XUV/X-Ray radiation within the enhancement resonator may occur with regard to the output coupling. Coherent XUV/X-Ray radiation may be coupled out of the resonator through a small opening within one of the resonator mirrors. Although the small opening may has a typical diameter of only 100 µm, it may essentially affect the function of the mirror as a result of diffraction, scattering and reduction of the reflecting surface. With a 1/e$^2$ beam radius of the photon flux density on the mirrors of about 500 µm, the small opening may represent a source of significant losses to the intra-resonator laser light.

OBJECTIVE OF THE INVENTION

The objective of the invention is to provide an improved method of generating high power laser light, which is capable of avoiding limitations of the conventional enhancement resonator techniques. In particular the objective is to increase the stored laser light average power and photon flux density in the foci. Furthermore, the objective of the invention is to provide an improved enhancement resonator, which is capable of avoiding disadvantages of the conventional techniques. In particular, the enhancement resonator is to be provided with a compact structure being capable of a stable operation with increased average power and photon flux density in the foci in practical applications, supporting different output coupling possibilities and/or providing a photon flux density on the mirrors allowing to decrease thermally induced aberrations by the mirrors and nonlinear mirror response. Furthermore, the objective of the invention is to provide an improved laser device including the enhancement resonator.

SUMMARY OF THE INVENTION

These objectives are solved by a method of generating laser light, an enhancement resonator and a laser device comprising the features of the independent claims. Preferred embodiments and applications of the invention are defined in the dependent claims.

According to a first aspect of the invention, the above objective is solved by a method of generating laser light in an enhancement resonator (intra-resonator laser light), wherein laser light is coherently added in the enhancement resonator having a plurality of curved resonator mirrors, wherein two consecutive curved mirrors form at least two detuned concentric mirror pairs (pairs of consecutive curved resonator mirrors) and a set of serially coupled detuned concentric curved mirror pairs form at least one enhancement resonator. In other words, the curved resonator mirrors subsequently arranged along the at least one resonator path pairwise have a detuned concentric configuration. The terms "mirror pair" or "pairs of consecutive curved resonator mirrors" here always refer to a mirror and its consecutive mirror on the resonator laser light path, thus e. g. a standing-wave resonator physically built from two curved mirrors comprises two consecutive curved mirror pairs.

The method of the invention comprises a step of coupling laser light into the enhancement resonator spanning at least one resonator path with a predetermined resonator length and a consecutive mirror pair distance (optical length at a central frequency of the laser light between the intersections of the laser light path with the two mirror surfaces). The laser light coupled into the enhancement resonator is either in pulsed mode with a spectral frequency comb structure, thus having a predetermined pulse repetition rate ($f_{rep}$), a pulse duration ($t_p$) and a carrier-envelope offset frequency ($f_{ceo}$), or in continuous-wave mode with at least one longitudinal mode. The enhancement resonator and the laser light is adjusted such that the longitudinal modes fit the enhancement resonator resonances. For pulsed operation the enhancement resonator mirror dispersion is adjusted such that after one resonator round-trip no significant dispersion is added to the laser light pulses.

Furthermore, the method comprises a step of coherent addition of the laser light coupled into the enhancement resonator so that e. g. at least one intra-resonator pulse or standing-wave is formed circulating or standing in the enhancement resonator. The intra-resonator light field constructively interferes with the laser light coupled into the enhancement resonator. The enhancement resonator used according to the invention includes at least two curved mirrors which provide two consecutive mirror pairs with a detuned concentric configuration.

Per definition, a concentric optical cavity is characterized by two at least locally spherical mirrors with reflecting surfaces, which are arranged on a common sphere, i. e. the distance d of the cavity mirrors equals two times the radius R of curvature thereof, $d=2 \cdot R$. Furthermore, the cavity light path has normal incidence relative to the reflecting surfaces.

The expression "pairs of consecutive curved resonator mirrors each having a detuned concentric configuration" or "detuned concentric configuration" used herein refers to a mirror configuration deviating from the concentric configuration with regard to at least one of the distance d between the mirrors (optical length at the central frequency of the laser light between the intersections of the laser light path with the two mirror surfaces) and the angle of incidence of the resonator laser light path to the curved mirror surfaces. The distance between two consecutive curved mirrors is reduced compared with the concentric configuration by a predetermined detuning distance (detuning distance subtrahend, $\Delta$). Furthermore, the angle of incidence of the resonator laser light path to the curved mirror surfaces deviates from normal to the reflecting mirror surface by a detuning angle ($\alpha$), wherein a closed resonator light path is obtained by serially coupling several consecutive curved mirror pairs with detuned concentric configuration until a stable enhancement resonator is formed.

While the concentric resonator is characterized by an inherent instability, the inventors have found that the enhancement resonators formed by consecutive curved mirror pairs with detuned concentric configuration have a sufficient stability for a continuous coherent addition of the input coupled laser light. Furthermore, the inventors have found that, compared to conventionally used resonators, the light field in resonators built of consecutive curved mirror pairs with detuned concentric configuration is characterized by an essentially enlarged beam radius on the reflecting surfaces of the resonator mirrors and an essentially reduced beam radius at the focal positions within the enhancement resonator. In particular, according to the invention, the enhancement resonator can be operated close to stability borders resulting in an increased beam radius on the mirrors and a corresponding small photon flux density on the mirrors (about a factor of 50 lower than for conventional designs), small foci ($1/e^2$ beam radius of photon flux density in the range of 10 µm to 20 µm) yielding high photon flux densities, a large variability of photon flux densities in the foci up to the order of $10^{16}$ W/cm², and small intra-resonator laser light losses by e. g. optional hole output coupling of the generated radiation.

According to a second aspect of the invention, the above objective is solved by an enhancement resonator for coherently enhancing laser light without using a laser amplifying medium, said enhancement resonator comprising at least two curved mirrors which provide at least two consecutive curved mirror pairs with detuned concentric configuration.

Generally, the enhancement resonator comprises n consecutive curved mirror pairs which are arranged in a standing-wave or ring type resonator configuration, whereas the number n is a positive integer number with $n \geq 2$, and these serially coupled consecutive curved mirror pairs form at least one enhancement resonator.

According to a third aspect of the invention, the above objective is solved by a laser device, being configured for generating laser light, e. g. in pulsed or continuous-wave mode and comprising a laser source device creating input laser light and the enhancement resonator according to the above second aspect of the invention.

Preferably, the mirrors of the enhancement resonator have highly reflecting dielectric coatings, in particular with a reflectivity loss below 1000 ppm, preferably below 150 ppm, e. g. below 100 ppm or even 50 ppm. To this end, the dielectric coatings preferably are made on resonator mirror substrates having a RMS surface roughness below 1 nm, preferably below 0.5 nm, e. g. below 0.2 nm. The embodiments using low loss mirrors as specified above have particular advantages for obtaining a high average power in the enhancement resonator.

Higher losses (like 1000 ppm) decrease the demands to a control system's active bandwidth, compared to a high finesse cavity with same intra-cavity average power and photon flux density on the mirrors as in the low finesse (high losses) case. Because a laser source device's repetition rate and carrier-envelope offset frequency or continuous-wave frequency correlated noise as well as the enhancement resonator's free spectral range and spectral transmission resonance position correlated noise perturbs the power enhancement of all spectral components of the input laser light with a sensitivity proportional to the resonator's finesse, a control system stabilizing the relative operation parameters named above between the laser source device and the enhancement resonator becomes more insensitive to perturbations and thus more stable with a lower enhancement resonator's finesse. In practice, for each application a best solution for the competing parameters finesse and control system stability can be found empirically, especially in case of complex laser-matter interactions like occurring with atomic clusters and laser light pulses.

According to a preferred embodiment of the invention, the laser light path length between the surfaces of a consecutive curved mirror pair with detuned concentric configuration is smaller than the sum of radii of curvature of the two curved mirrors by the predetermined detuning distance subtrahend, which is selected in dependency on optical parameters of the enhancement resonator, like the laser light path geometry, the resonator aperture, the effective focal length and the enhancement resonator stability, and parameters of the laser light coupled into the enhancement resonator, like e. g. the central wavelength and the repetition rate. The detuning distance subtrahend can be estimated by numerical simulations of the optical light field in the enhancement resonator and additionally can be adjusted experimentally because the light field can penetrate the different possible mirror coatings and structures with different depths. This penetration effect can be considered by an empirical wavelength and photon flux density depending offset ($\Delta_{offset}$) to be subtracted for each resonator mirror from the enhancement resonator length.

The complete (effective) enhancement resonator length can be defined by the sum $$L_{res} = \Sigma_n L_n = \Sigma_n (R_{1,n} + R_{2,n} - \Delta_{offset\_1,n} - \Delta_{offset\_1,n} - \Delta_n)$$

where n is a positive integer number marking the index of the consecutive curved mirror pairs with detuned concentric configuration. Thus this effective length can be a non-scalar parameter—because of wavelength and photon flux density dependence it forms a multi-dimensional parameter space. In the present specification, the length and detuning distance subtrahend refer to a predetermined central wavelength, e. g. 1042 nm, and a predetermined maximum photon flux density, e. g. $4 \times 10^{11}$ W/cm$^2$ on any of the mirrors.

As an advantage of the invention, the laser light average power stored in the enhancement resonator and the photon flux density in the foci of the curved mirrors can be increased while staying below a nonlinear mirror response threshold due to the photon flux density on the mirrors—because the nonlinearities yield dominating losses in the regime above the named threshold. Below the photon flux density threshold the enhancement resonator formed by dielectric highly reflecting mirrors behaves linearly, as shown experimentally by I. Pupeza et al. ("Optics Letters" vol. 35, p. 2052-2054 (2010)). As an example, a lower limit of the detuning distance ($\Delta$) can be estimated such that the laser light in the consecutive curved mirror pairs with detuned concentric configuration can be focussed to a minimum focal radius $$w = M^2 \lambda / (\pi \arctan(D/2f))$$

with $M^2$: beam quality parameter, e. g. $M \le 1.3$), $\lambda$: central wavelength, e. g. 1042 nm, D: limiting aperture, e. g. 10 mm to 50 mm, and f: effective focal length, the latter depending on the repetition rate or the continuous-wave frequency of the laser light input. As an example, with a two mirror enhancement resonator in standing-wave configuration (see below), a central wavelength of the laser light of 1042 nm and including two circulating pulses with a repetition rate of 250 MHz the effective focal length is 300 mm and the diffraction limited, thus minimum achievable beam waist radius is about 5 μm.

The inventors have found limits of the detuning distance subtrahend which generally can be used for providing different designs of the inventive enhancement resonator. The detuning distance subtrahend ($\Delta$) preferably is at least 150 nm, particularly preferred at least 500 nm, e. g. at least 1 μm. These limits are particularly preferred with a two mirror enhancement resonator having standing-wave configuration. On the other hand, the preferred detuning distance subtrahend may be at most 150 μm, particularly preferred at most 95 μm, e. g. at most 70 μm. These limits are particularly preferred with other applications, e. g. a four mirror enhancement resonator having a bow tie ring configuration (see below) with very small detuning angles of e. g. 7.5 mrad. In this case the detuning distance is limited by the diffraction losses due to the increasing beam radii on the mirrors which are irradiated near the mirror edges because of the small detuning angle.

The detuning distance subtrahend is in the range of at least 150 nm to at most 150 μm from the border of stability marked by a concentric configuration, increasing towards the direction of rising enhancement resonator stability.

With the bow tie ring configuration of the enhancement resonator, a preferred detuning angle of at least 7.5 mrad, preferably, at least 15 mrad and at most 150 mrad, preferably at most 50 mrad has been found. These limit results from transverse electromagnetic mode aberrations, e. g. astigmatism, and the preferable detuning angle e. g. also may depend on interference control of the continuous-wave or two circulating pulses in the central focus of the four mirror bow-tie configuration which enables the control of the direction of the resulting wave vector at this position.

According to a further preferred embodiment of the invention, the enhancement resonator is adjusted such that the laser light has a $1/e^2$ beam radius of the photon flux density on each of the mirrors of at least 2 mm, e. g. 3.5 mm or more, in particular at least 5 mm.

The at least two consecutive curved mirror pairs with detuned concentric configuration may provide the inventive enhancement resonator or a part thereof; i. e. according to the invention, the enhancement resonator may comprise two or multiple consecutive curved mirror pairs with detuned concentric configuration, possibly in combination with at least one additional curved or plane mirror. With further details, the following embodiments are preferred.

According to a first embodiment, the enhancement resonator may comprise four curved mirrors, which are arranged in a bow tie ring configuration. Thus, four consecutive curved mirror pairs with detuned concentric configuration are arranged with crossing light paths. Due to a detuning angle the four consecutive curved mirror pairs are serially coupled, thus commonly allowing a stable operation of the enhancement resonator. As an advantage, the bow tie ring configuration has four focal positions where the two central foci coincide, thus increasing the flexibility in adjusting the photon flux density, the direction of the effective wave vector by interference of the two central foci and selecting an output coupling mechanism.

Furthermore, the bow tie configuration can be designed with an extremely small angle between the crossing light paths within the resonator. Thus, according to a particularly preferred embodiment of the invention, sections of the resonator light path in the bow tie configuration have a crossing angle below 150 mrad, e. g. below 30 mrad. The crossing angle reduction obtained with the invention has in particular advantages in reducing astigmatism aberrations, thus providing more circular shaped transverse mode profiles on the mirrors enabling high input coupling mode overlap, small foci and adjustable interference of at least two circulating pulses or the at least one continuous-wave in the center focus of the bow tie configuration.

According to a second embodiment, the enhancement resonator may comprise one single pair of curved mirrors, which are arranged in a standing-wave configuration forming two consecutive curved mirror pairs with detuned concentric configuration. This embodiment has an advantage in terms of a simple geometry with improved stabilization capability. With the standing-wave configuration normal incidence is obtained on the reflecting surfaces of the resonator mirrors (the detuning angle equals 0), thus astigmatism is minimized. Furthermore, the standing wave configuration is capable of accommodating multiple resonator laser light paths, e. g. two or even more resonator light paths, each of which forming a separate enhancement resonator.

Thus, according to a further particularly preferred embodiment of the invention, the coupling step of the inventive method may comprise coupling the laser light into the enhancement resonator such that at least two different resonator laser light paths are spanned.

With the first and second embodiments, all mirrors of the enhancement resonator are curved mirrors. To reduce the size of the setup, plane mirrors can be used to fold the light path between the curved resonator mirrors. Thus, according to a third embodiment, the enhancement resonator may comprise at least two of the curved mirrors and a plane mirror (ring configuration of the enhancement resonator). The plane mirror may comprise an optical structure providing a reflecting plane for the resonator laser light, like e. g. a dielectric mirror or a mirror with a particular wavelength or angle characteristic, and a diffracting plane like e. g. a XUV grating etched onto the plane mirror surface or a Bragg-crystal for diffracting the generated X-ray radiation off the resonator laser light path. In the latter case the intra-resonator laser-light reflecting surface of the crystal, which might be coated for providing low losses to intra-resonator laser light, has a predetermined angle to the X-ray diffracting crystal planes, thus it can not be a cleaved crystal surface as usual used for Bragg diffraction. As potential advantages, the plane mirror surface introduces additional degrees of freedom for output coupling. As it can be used to form a ring resonator, optical isolators can be omitted, which simplifies input coupling to the enhancement resonator and the plane mirror surface may also be used for intra-resonator group delay dispersion compensation. Furthermore a crystal, e. g. lithium-niobate, for THz radiation generation can be used as plane reflecting surface as reported by M. Theuer et. al. "Terahertz generation in an actively controlled femtosecond enhancement cavity," Appl. Phys. Lett. 93, 041119 (2008).

Contrary to the concentric cavity, the shape of the reflecting surfaces of the curved mirrors is not limited to spherical shapes with identical radii of curvature. In practice, the reflecting surfaces may have any shape with a locally spherical portion, wherein the reflecting surfaces may have identical or different radii of curvature. Thus, as a further advantage of the invention, the shape and size of the curved resonator mirrors can be selected in dependency on the requirements of a particular application.

Although there are no further limitations with regard to the mirror design, according to a preferred embodiment of the invention, all the curved mirrors are spherical mirrors. Using spherical mirrors may have advantages with regard to commercial availability of proper substrates for highly reflecting dielectric coatings. Particularly preferred is an embodiment, where all curved mirrors of the enhancement resonator have equal radii of curvature.

Typically, the laser light pulses or continuous-waves are coherently added to one single intra-resonator pulse circulating or to one continuous-wave mode standing in the enhancement resonator. Alternatively, multiple laser pulses can be excited in the enhancement resonator, which circulate along one common resonator path or along multiple different resonator paths in the enhancement resonator. Adding laser light pulses to a plurality of resonator pulses can be obtained by multiplying the pulse repetition rate by the reciprocal number of circulating resonator pulses or the resonator length by the number of circulating resonator pulses.

Caused by laser beam divergence, the transverse mode diameter of the optical light field increases and the photon flux density on the mirrors decreases further with the number of circulating resonator pulses and thus enables a higher average power and photon flux density inside the enhancement resonator, but an increasing resonator length also sets a trade-off due to the decreasing mechanical stability of the resonator—it's vibration sensitivity increases. Nonlinear and thermal effects in the mirrors due to a large photon flux density and average power inside the enhancement resonator can be reduced by increasing the spot diameter. Additionally, by varying the focusing parameters, the photon flux density can be selected in dependency on requirements of the particular application in a broad range, e. g. for generating XUV, soft or hard X-ray or THz radiation.

The pulse repetition rate ($f_{rep}$) and carrier-envelope offset frequency ($f_{ceo}$) or the continuous-wave frequency of the input laser light can be actively controlled to dynamically minimize perturbations and to maximize the intra-resonator enhancement. To this end, a control device being adapted for actively adjusting these parameters can be used.

While loading of the enhancement resonator with two or more pulses is known as such from U.S. Pat. No. 6,038,055, the inventive combination with arranging resonator mirrors as consecutive curved mirror pairs with detuned concentric configuration yields an essential advantage in terms of the repetition rate of the pulses. Due to the reduced risk of destroying the resonator mirrors, the repetition rate of the pulses can be at least 100 MHz, preferably at least 250 MHz, in particular at least 500 MHz, or even 1 GHz or more, resulting in an increased average power inside the enhancement resonator.

According to preferred embodiments of the invention, at least one of the following measures is available for stabilizing the enhancement resonator. Firstly, the distance between consecutive curved mirror pairs with detuned concentric configuration (L) can be actively controlled, e. g. using a piezo electric drive connected with at least one of the resonator mirrors. Secondly, the angle of incidence of the resonator laser light to the resonator mirrors can be actively controlled, e. g. with a piezo electric drive. Thirdly, the laser source device's repetition rate ($f_{rep}$) and carrier-envelope offset frequency ($f_{ceo}$) or the continuous-wave frequency can be actively controlled to the enhancement resonator. Furthermore, a beam pointing stabilization can be provided for actively controlling the position and direction in space of the laser light coupled into the enhancement resonator. The beam pointing stabilization, manufacturer: e. g. TEM Messtechnik GmbH, Germany, can be implemented as it is known from conventional interferometer applications Furthermore, as a particularly preferred measure, the enhancement resonator, in particular the mirrors thereof can be isolated from potential external mechanical oscillations. With this embodiment, the enhancement resonator preferably is positioned on an active mechanical oscillation isolation device, like a six degree of freedom compensating electro-magnetic and/or piezo electric drive with a control system, manufacturer: e. g. hwl SCIENTIFIC INSTRUMENTS GmbH, Germany, which damps mechanical vibrations by counter propagating the complete enhancement resonator setup relative to the vibration oscillation by about the same amplitude (isolation preferably at least in the range from 0.7 Hz to 200 Hz).

According to preferred applications of the invention, the method of generating high power laser light and the laser device are used for generating coherent or non-coherent XUV, soft and hard X-ray or THz radiation by an interaction of the laser light e. g. with atomic or molecular beams, either each with a clustered or non-clustered structure of the beam constituents, and/or generating hard X-ray radiation by an interaction of laser pulses e. g. with bunches of relativistic electrons. The laser light (the at least one intra-resonator pulse or continuous-wave) created according to the invention can be provided for an application outside or inside the enhancement resonator. In the first case, the at least one intra-resonator pulse can be coupled out of the enhancement resonator, e. g. with a switchable electro-optically refractive or reflective element. In the second case, the at least one intra-resonator pulse is created for an application within the enhancement resonator, e. g. by an interaction of the at least one intra-resonator pulse with a target, e. g. an electron bunch or atomic cluster beam for generating coherent or non-coherent XUV, soft and hard X-ray or THz radiation.

According to the second alternative, the inventive method preferably comprises a step of providing the target (target material), e. g. atomic clusters or an electron bunch, at a focal position between two curved mirrors, i. e. at a focal position in the at least two consecutive curved mirror pairs with detuned concentric configuration. The target provided in an environment of reduced gas pressure (in particular air pressure), which includes at least the focal position or the complete enhancement resonator. The electron bunch is adjusted such that it counter propagates to the at least one intra-resonator pulse and radiation created by the interaction can be coupled out of the enhancement resonator.

Various output coupling techniques are available, which preferably comprise at least one of output coupling through an hole in one of the resonator mirrors, through a gap between or aside two of the resonator mirrors, and using an additional optical element deflecting the generated radiation from the resonator laser light path, in particular a grating, Bragg crystal or a Brewster plate arranged along the resonator laser light path.

As an essential advantage of the first variant, the losses to the intra-resonator laser-light can be reduced by a factor of up to 40 in the bow tie, and up to 400 in the standing-wave embodiment relative to a $1/e^2$ beam radius of the photon flux density of 500 µm in standard enhancement cavities on the mirrors, respectively. The hole in the resonator mirror, which has e. g. a cylindrical geometry and a diameter below 500 µm, particularly preferred below 200 µm, e. g. 100 µm or smaller only weakly distorts the light field traveling within the enhancement resonator, where the light field has a spot radius on the resonator mirror as specified above. As an advantage, the transverse electromagnetic field inside the enhancement resonator 20 is not restricted to the fundamental mode (TEM00), also a higher-order transversal electromagnetic mode can be excited in the enhancement resonator, e. g. the TEM01 mode. By doing so losses due to holes in mirrors can be further minimized.

Output coupling through a gap between or aside two of the resonator mirrors can be provided with the bow tie embodiment and the multiple resonator paths standing-wave embodiment of the enhancement resonator by adjusting the direction of the effective wave vector of the two interfering central foci. Any distortions of the light field by output coupling elements within the enhancement resonator can be avoided with this approach. Finally, the embodiment using a wavelength-selective grating for XUV/X-ray radiation etched into a resonator mirror may have same advantages in terms of setting an output coupling direction relative to the resonator laser light path. The grating may be implemented in the plane reflecting surface used in the ring configuration embodiment.

For supplying the target within the enhancement resonator, a target source device is preferably provided, which is configured for positioning the target at a focal position between two curved mirrors. The atomic cluster target source device e. g. comprises a Laval-nozzle connected via a supply line to a reservoir of the target constituents, e. g. a mixture of or pure gases like nitrogen, oxygen, helium, neon, argon, krypton or xenon. For supplying the electron bunches, an electron beam source is adjusted such that the electron bunch crosses the focal position between or aside the curved resonator mirrors in counter propagating direction relative to the enhancement resonator laser pulses. The electron bunch can be directed into and/or out of the enhancement resonator using a magnetic beam guiding device, e. g. magnetic beam guiding coils.

The invention has the following further advantages. Although the maximum accepted photon flux density on the resonator mirrors of about $4 \times 10^{11}$ W/cm$^2$ is a technological limit obtained with experiments, the use of consecutive curved mirror pairs with detuned concentric configuration according to the invention allows an essential increase of the photon flux density within the enhancement resonator foci. Nonlinear effects on the mirrors causing dominating losses above the photon flux density threshold are completely avoided.

The inventive enhancement resonator provides the possibility of investigating coherent and non-coherent XUV, soft and hard X-Ray or THz radiation generation in different target materials, e. g. atomic or molecular gases (like noble gases, nitrogen or oxygen), or atomic and molecular clusters (Van-der-Waals, metallic and ionic clusters) consisting e. g. of the gases and mixtures thereof named above and different output coupling or collecting and guiding approaches. Furthermore, soft and hard X-ray generation by Thomson-scattering, high-order harmonic generation and explosions of atomic or molecular clusters with possible output coupling of coherent or collecting and guiding of non-coherent radiation can be investigated, e. g. described by T. Ditmire et. al. ("Interaction of intense laser pulses with atomic clusters", Phys. Rev. A, Vol. 53, p. 3379-3402 (1996)) or by K. Sakaue et. al. ("Observation of pulsed X-ray trains produced by laser-electron Compton scatterings", Rev. Sci. Instrum., Vol. 80, No. 12, p. 123304-123311 (2009)).

BRIEF DESCRIPTION OF THE DRAWINGS

Further features and advantages of the invention are described in the following with reference to the attached drawings, which show in.

PREFERRED EMBODIMENTS OF THE INVENTION

Embodiments of the invention are described in the following with exemplary reference to enhancement resonators having two, three or four curved resonator mirrors. It is emphasized that the invention can be implemented in an analogue manner with another number, in particular more than four resonator mirrors. The resonator geometry can be adjusted by experiment or by numerical design of the optical set-up based on available software solutions.

Preferred features of the invention are described with particular reference to the provision of at least two curved mirrors forming two consecutive curved mirror pairs with detuned concentric configuration. Therefore, FIGS. 1 to 5 focus on the enhancement resonator design, while FIG. 7 further illustrates features of an inventive laser device. Features of the method of generating high power laser light and the laser device, in particular with regard to the design and adjustment of an input coupling mirror, the synchronisation of the laser source device and the enhancement resonator, and the provision of the enhancement resonator in an environment of reduced gas pressure (in particular air pressure), are not described as far as they are known from conventional techniques, e. g. from U.S. Pat. No. 6,038,055 or US 2006/0268949 A1, the contents of which being introduced into the present disclosure by reference.

Figure 1:
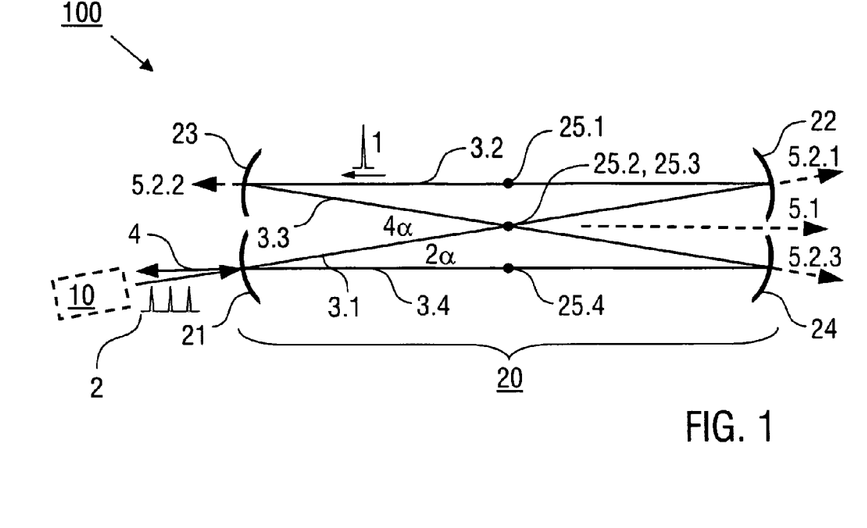
FIGS. 1 to 4: schematic illustrations of enhancement resonators used according to different embodiments of the invention.

FIG. 1 schematically shows an embodiment of the inventive laser device 100, which comprises a laser source device 10 and an enhancement resonator device 20. The laser source device 10 comprises a laser unit (see FIG. 7), which is arranged for generating primary laser light pulses or continuous-wave modes 2 to be coupled into the enhancement resonator 20. The laser source device 10 comprises any conventional pulsed or continuous-wave laser, like e. g. a titanium-sapphire laser, a Yb:KYW laser or a combination of a pulsed laser with a chirped pulse amplification (CPA) system. As an example, the laser source device 10 is operated such that the primary laser pulses 2 are generated with a repetition rate of 250 MHz, a pulse duration of 200 fs, an optical average power of 200 W to 500 W or more and a centre wavelength of about 1042 nm. Further details of the laser source device 10 are described below with reference to FIG. 7. Additionally, the laser device 100 includes monitoring and control units (not shown) as it is known from conventional applications of enhancement resonators.

The enhancement resonator 20 of FIG. 1 represents the first embodiment of the invention, wherein four curved resonator mirrors 21 to 24 are arranged in a bow tie configuration. This configuration is characterized by a ring resonator geometry with crossed beam paths, wherein the curved resonator mirrors 21 to 24 provide four consecutive curved mirror pairs with detuned concentric configuration (21-22, 22-23, 23-24, 24-21). Therefore, this embodiment is also called "off-axis-quasi-concentrically" bow tie resonator. The resonator mirrors 21 to 24 are arranged such that the laser light paths between consecutive curved mirror pairs with detuned concentric configuration are arranged in a plane, e. g. in a horizontal plane (parallel to the drawing plane).

The resonator laser light path has a complete length $L_{res}$ being equal to even multiples of $n_{ref} c / f_{rep}$ (c: speed of light in vacuum, $f_{rep}$: repetition rate of the laser light pulses 2, $n_{ref}$: average refractive index on the light path).

The curved resonator mirrors are e. g. highly reflecting dielectric mirrors as described e. g. by H. R. Bilger et al. ("Origins of fundamental limits for reflection losses at multilayer dielectric mirrors", Appl. Opt., Vol. 33, No. 31, p. 7390-7396 (1994)). They comprise an input coupling mirror 21 (IC-mirror 21) and three highly reflecting mirrors 22 to 24 (HR-mirrors 22 to 24). The HR-mirrors 22 to 24 have a higher reflectivity than the IC-mirror 21. As an example, the complete losses of the IC-mirror are about 130 ppm while the complete losses of each of the HR-mirrors 22 to 24 is about 40 ppm. The reduced reflectivity of the IC-mirror 21 is provided for impedance matching of the IC mirror to the enhancement resonator round-trip losses to facilitate the input coupling of the laser light pulses 2 into the enhancement resonator 20 with low losses and output coupling an interference output signal 4. The interference output signal 4 is guided to a control device (see FIG. 7) for implementing a control system stabilizing the relative operation parameters of the laser source device 11 and the enhancement resonator 20.

Impedance matching means, that the complete round trip losses of the resonator (except for the input coupling mirror) due to scattering, absorption and transmission equal the transmission of the input coupling mirror. According to a variant of the invention, the reflectivity loss of the input coupling mirror can be larger than the complete losses of the remaining resonator mirrors (increased transmission of the input coupling mirror). In this case, the enhancement resonator is over-coupled resulting in advantages in terms of stabilizing the laser unit and the resonator relative to each other using the Pound-Drever-Hall frequency stabilization and an improved control signal with an increased signal-to-noise-ratio can be obtained, e. g. described by E. D. Black ("An introduction to Pound-Drever-Hall laser frequency stabilization", Am. J. Phys., Vol. 69, Issue 1, p. 79-87 (2001)).

The IC-mirror 21 is arranged for input coupling the laser light 2 from the laser source device 10 along a first resonator laser light path section 3.1 between the first consecutive curved mirror pair with detuned concentric configuration 21-22 towards the HR-mirror 22, where it is reflected along a second path section 3.2 towards the HR-mirror 23. The resonator laser light path is closed by further reflections along the third path section 3.3 towards the HR-mirror 24 and along the fourth path section 3.4 back to the IC-mirror 21.

In the illustrated embodiment, all mirrors 21 to 24 are spherical mirrors with a common radius of curvature R of e. g. 300 mm. As a typical example, the curved mirrors have a diameter of about 25 mm. The pairwise distances L of the intersection of the resonator laser light path with the mirror surfaces 21-22, 22-23, 23-24, and 24-21 are equal to 2·R reduced by a predetermined detuning distance subtrahend A and offset values, i. e. $L = 2 \cdot R - \Delta_{offset\_1} - \Delta_{offset\_2} - \Delta$, wherein the detuning distance subtrahend A is at least 100 μm, in particular 90 μm for the horizontal resonator laser light path sections, and between 20 μm and 30 μm, in particular 23 μm for the diagonal resonator laser path sections in 20. The detuning angle is at least 7.5 mrad, in particular at least 25 mrad. The penetration depth of the light field into the mirrors and mirror structures $\Delta_{offset}$ varies with the type of mirror used and can be adjusted experimentally.

Each pair of curved mirrors 21-22, 22-23, 23-24 and 24-21 represents a consecutive curved mirror pair with detuned concentric configuration, so that four focal positions 25.1 to 25.4 are created. The focal positions 25.2, 25.3 coincide resulting in an advantageous doubling of the photon flux density and the possibility of interference of at least two circulating intra-resonator pulses or the continuous-wave mode for non-collinear radiation generation. The interference enables to adjust the direction of the effective wave vector and thus e. g. enables the electron beam to be aligned aside or between two resonator mirrors, e. g. 22 and 24, and steering the direction of the generated radiation.

While FIG. 1 represents a schematic illustration only, the enhancement resonator 20 has a longitudinal shape in practice, wherein the length of the resonator laser light path sections 3.2 and 3.4 (e. g. about 599.91 mm) is comparable to the length of the resonator laser light path sections 3.1 and 3.3 (e. g. about 599,977 mm). As a result, the crossing angle of the resonator laser light path sections 3.1 and 3.3 below 30 mrad can be obtained.

The inventive method of generating high power laser light using the laser device 100 of FIG. 1 comprises the following steps. Laser light 2 is generated with a predetermined pulse repetition rate or continuous-wave frequency using the laser source device 10. The laser light 2 is coupled into the enhancement resonator 20 through the IC-mirror 21. The operation of the laser source device 10 is adjusted such that the laser light coupled into the enhancement resonator 20 is coherently added to the intra-resonator laser light 1. In pulsed operation the number of circulating intra-resonator pulses can be adjusted by selecting at least one of the enhancement resonator (20) length and the laser source device's (10) repetition rate relative to each other. The circulating intra-resonator pulse(s) irradiate(s) the mirror surfaces with a $1/e^2$ beam radius of the photon flux density of about 2 mm to 4 mm. As a result, the average power of the intra-resonator pulse(s) can be increased up to the range above 500 kW, in particular above 1 MW. This provides a focus peak photon flux density up to about $1\times10^{15}$ W/cm$^2$.

For generating coherent or non-coherent light pulses in an XUV/X-Ray or THz frequency range, a target, like e. g. atomic or molecular gases (like noble gases, nitrogen or oxygen), or atomic and molecular clusters (Van-der-Waals, metallic or ionic clusters), is supplied at one of the focal positions 25.1 to 25.4. The target material is supplied with a direction perpendicular to the plane extended by the beam path of the enhancement resonator (perpendicular to the drawing plane). Due to the interaction of the intra-resonator laser light 1 with the target, coherent radiation in the XUV/X-Ray wavelength range is generated, which is coupled out of the enhancement resonator 20, e. g. through a gap between the mirrors 22 and 24 (see dashed arrow 5.1) or aside them, through a hole, e. g. a cylindrical and cone hole in mirror (see dashed arrow 5.2 and FIG. 6), by a plate under Brewster's angle for the intra-resonator laser light, by a diffraction grating for XUV wavelengths etched onto a plane mirror or by a Bragg-crystal for X-Ray wavelengths. Non-coherent radiation is collected and guided by appropriate optics, e. g. a toroidally bent crystal, grazing incidence multilayer optics and ellipsoidal- or poly-capillaries in case of X-ray radiation. THz radiation is collected and guided e. g. by metal, photonic crystal or multilayer mirrors and optics made from silicon, high density polyethylene, polymethylpentene or polytetrafluoroethylene.

Figure 2:
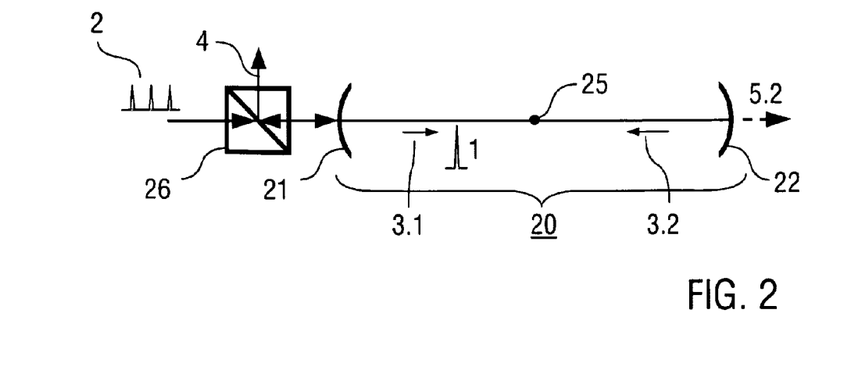

FIG. 2 illustrates the second embodiment of the invention, wherein the enhancement resonator 20 has a standing-wave configuration. In this case, the enhancement resonator 20 comprises two curved mirrors 21 and 22, which define the two consecutive curved mirror pairs with detuned concentric configuration. Both curved mirrors 21 and 22 are spherical mirrors having a diameter of e. g. 25 mm and a radius of curvature R of e. g. 300 mm. The distances L of the curved mirrors 21-22 and 22-21 again equal $2R-\Delta_{offset\_1}-\Delta_{offset\_2}-\Delta$, with $\Delta$ being the detuning distance subtrahend of at least 150 nm and a zero detuning angle. As a result, the average power of the circulating intra-resonator pulse(s) can be increased up to the range above 1 MW, in particular above 2 MW. This provides a photon flux density in the focus of up to about $2\times10^{16}$ W/cm$^2$.

The first curved mirror 21 is an input coupling mirror (IC-mirror, complete losses e. g. about 50 ppm) having a lower reflectivity compared with the second curved mirror 22, which is also a high reflectivity mirror (HR-mirror, complete losses e. g. about 40 ppm). The laser light 2 is coupled through the first curved mirror 21 into the enhancement resonator 20. Simultaneously, the interference output signal 4 is coupled out of the enhancement resonator 20 and directed to a control device (not shown) using a Faraday isolator 26.

For generating coherent or non-coherent light pulses in the XUV/X-Ray and THz range, a target is supplied at the focal position 25. Due to the interaction of the intra-resonator laser light 1 with the target, e. g. high-order harmonic radiation is generated, which is coupled out of the enhancement resonator 20 through a hole in mirror 22 (see dashed arrow 5.2 and FIG. 6, e. g. a cylindrical and/or conical hole), by a plate under Brewster's angle for the intra-resonator laser light, by a diffraction grating for XUV wavelengths or a Bragg-crystal for X-ray wavelengths arranged in the enhancement resonator (not shown). The $1/e^2$ beam radii of the photon flux densities of the light spots on the mirrors 21 and 22 are in the range of about 5 mm to 13 mm, so that a minimum distortion of the light field is introduced by the output coupling hole in one of the mirrors (22). In the latter case, the mirrors 21 and 22 have a diameter of e. g. 50 mm.

Figure 3:
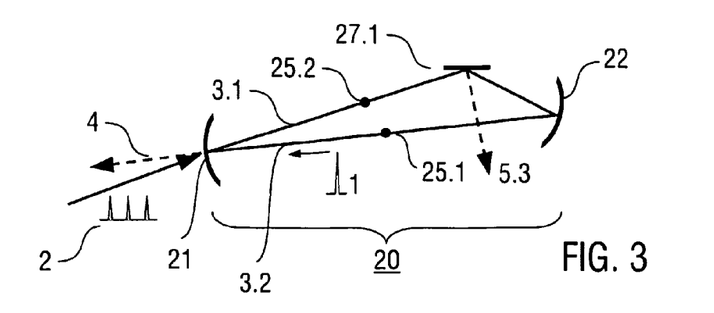
Figure 4:
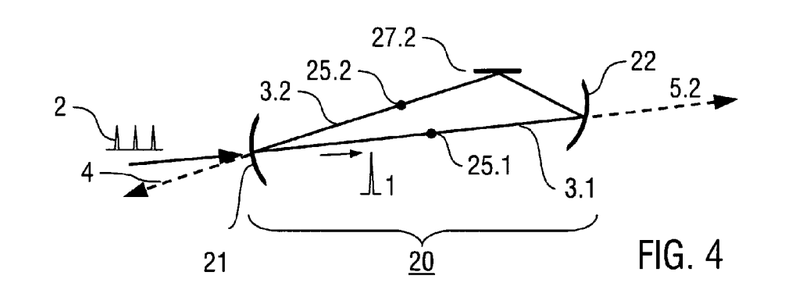

Variants of a third embodiment of the invention are schematically illustrated in FIGS. 3 and 4, wherein the enhancement resonator 20 comprises a pair of two curved mirrors 21, 22 and a plane mirror 27.1 or 27.2 providing a ring configuration. FIGS. 3 and 4 represent schematic illustrations only. The practical enhancement resonator 20 has a longitudinal shape, wherein the lengths of the resonator laser light path sections 3.1 and 3.2 are nearly the same. Similar to the embodiment of FIG. 2, the curved mirrors 21 and 22 form two consecutive curved mirror pairs with detuned concentric configuration each providing a separate focal position 25.1 and 25.2. The first curved mirror 21 is the input coupling mirror (IC-mirror) having a lower reflectivity compared with the second curved mirror 22, which is also a highly reflecting mirror (HR-mirror). The laser light 2 is coupled in through the IC-mirror 21 into the enhancement resonator 20, where they are added coherently to the intra-resonator laser light 1. Simultaneously, the interference output signal 4 is coupled out of the enhancement resonator 20 and directed to a control device (not shown).

According to FIG. 3, the ring-shaped enhancement resonator 20 includes a grating mirror or Bragg-crystal 27.1 providing the plane mirror and being arranged for a wavelength selective reflection of the generated radiation out of the enhancement resonator 20. E. g. high-order harmonic radiation is generated at the focal position 25.2 due to an interaction of the intra-resonator laser light 1 with a target. The flat mirror 27.1 is provided for output coupling the high-order harmonic radiation aside the intra-resonator laser light beam path along the path 5.3 and for reflecting the intra-resonator laser-light 1 towards the curved mirror 22. Alternatively, the ring-shaped enhancement resonator 20 includes a flat mirror 27.2 as shown in FIG. 4. In this case, e. g. high-order harmonic radiation created at focal position 25.1 can be coupled out the resonator through a hole in the curved mirror 22 (see arrow 5.2). Output coupling through a hole in the curved mirror 22 can be provided with the variant of FIG. 3 as well.

Figure 5:
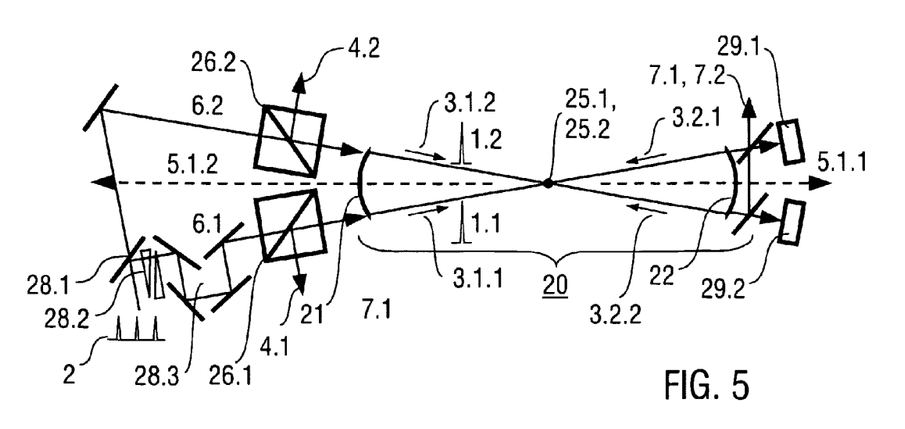
FIG. 5: a schematic illustration of creating two enhancement resonators within two pairs of consecutively detuned concentric mirrors with a standing wave configuration.

FIG. 5 illustrates a modified version of the second embodiment using the standing-wave configuration of FIG. 2. Contrary to FIG. 2, the enhancement resonator 20 is arranged for input coupling the laser light 2 along two different resonator laser light paths 6.1 and 6.2. To this end, the laser light 2 generated with a laser source device (not shown) is split into two different input paths 6.1 and 6.2 formed by a splitting mirror 28.1, a dispersion control unit 28.2 and a delay stage 28.3. Each input path 6.1 and 6.2 includes a Faraday isolator 26.1 and 26.2 being arranged for collecting the interference output signals 4.1 and 4.2 for each of the two consecutive curved mirror pairs with detuned concentric configuration 3.1.1-3.2.1 and 3.1.2-3.2.2, respectively. As illustrated the four mirror pairs, thus two enhancement resonators, or even more resonators, e. g. 3, 4, . . . , may be realized in parallel with two spherical mirrors only.

The splitting mirror 28.1 is a semi-transparent mirror having a reflectivity of e. g. 50%. The dispersion control unit 28.2 comprises an adjustable double-prism. The delay stage 28.3 is arranged for a time synchronization in case of pulsed operation of the laser light pulses 2 coupled into the enhancement resonator 20. The delay stage 28.3 is adjusted such that the laser light pulses 2 are simultaneously coupled into the enhancement resonator 20 along both input paths 6.1 and 6.2. As a result, the intra-resonator pulses 1.1 and 1.2 circulating in the enhancement resonator 20 simultaneously pass the focal position 25, so that both pulses interfere, thus enabling bidirectional non-collinear XUV/X-Ray or THz radiation generation, e. g. with output coupling via a hole in the center of each of the curved mirrors 21 and 22 (see arrows 5.2.1 and 5.2.2) or aside the curved mirrors, and the photon flux density can be increased by about a factor of the number of interfering pulses.

FIG. 5 illustrates that for each of the two consecutive curved mirror pairs with detuned concentric configuration 3.1.1-3.2.1 and 3.1.2-3.2.2, a two-dimensional photo detector 29.1 and 29.2 is provided, which is arranged for collecting a beam pointing stabilization signal 7.1 and 7.2. Additionally, a portion of the out-coupled light can be used as a beat signal for controlling the delay stage 28.3.

Figure 6:
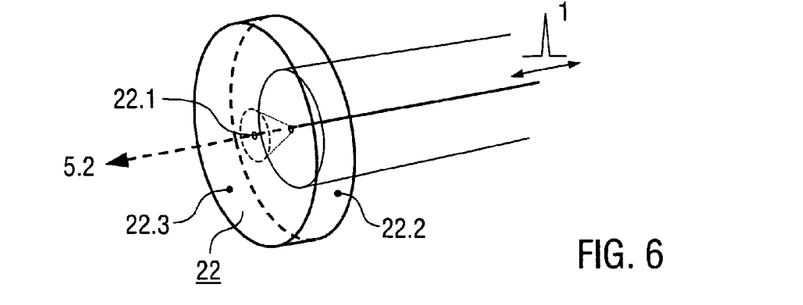
FIG. 6: a schematic illustration of the collinear output coupling of radiation through a conical hole in a resonator mirror.

FIG. 6 schematically illustrates the diffraction loss reduction obtained with the inventive use of consecutive curved mirror pairs with detuned concentric configuration. As an example, the HR-mirror 22 is illustrated (see FIG. 2) which includes an output coupling hole (22.1) extending through the body of the mirror 22 from the reflecting surface 22.2 to the back-side 22.3 thereof. The light field of the intra-resonator laser-light 1 has a $1/e^2$ beam radius of the photon flux density on the reflecting surface 22.2 of about 10 mm. The hole 22.1 has a diameter of about 100 µm. Accordingly, there is only a weak distortion of the light field of the intra-resonator laser light 1, and high-order harmonic generation light 5.2, e. g. the $81^{st}$ harmonic of 1042 nm with λ=13 nm can be efficiently coupled out of the enhancement resonator.

Figure 7:
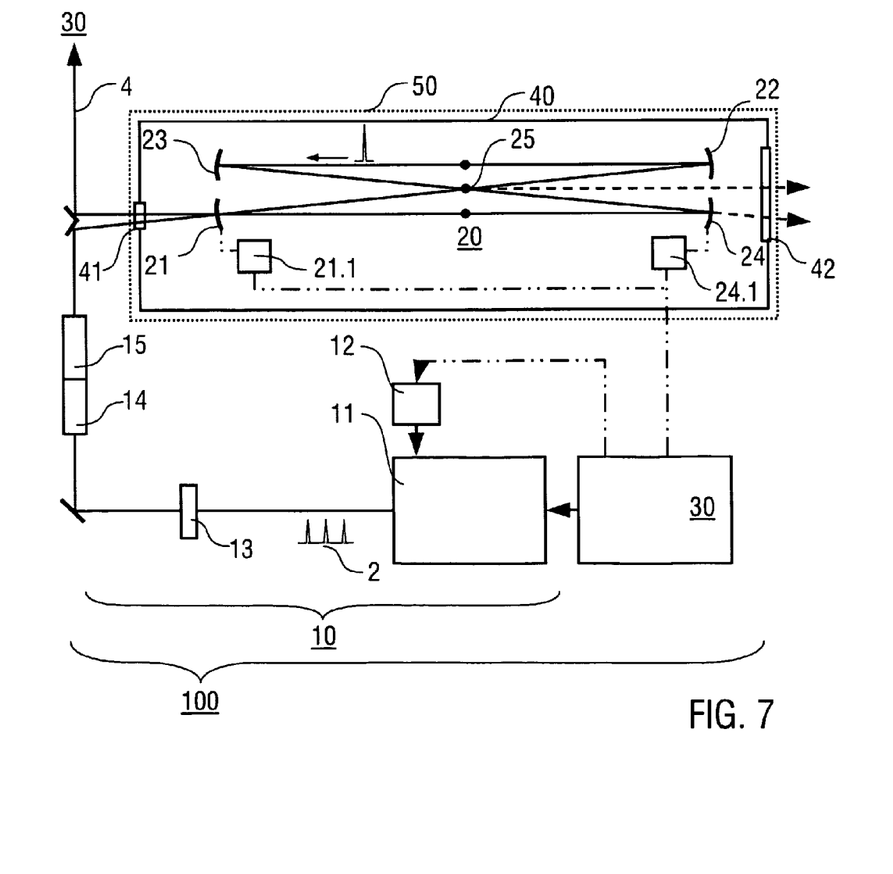
FIG. 7: a schematic illustration of further details of an embodiment of a laser device according to the invention.

FIG. 7 illustrates further details of the inventive laser device 100 including the laser source device 10, the enhancement resonator 20 and a control device 30. The laser device 10 comprises a laser unit 11 and a repetition rate control 12. The repetition rate and continuous-wave-frequency control 12 is adapted e. g. for controlling the resonator length of the laser unit 11 as it is known from conventional lasers. The repetition rate control 12 is a crucial feature to stabilize the oscillator repetition rate or continuous-wave frequency to the free spectral range and transmission resonances of the passive resonator, thus enabling efficient enhancing the input laser light within the enhancement resonator. The laser light 2 generated with the laser unit 11 is directed via optical components 13, 14 and 15 to the IC-mirror 21 of the enhancement resonator 20. The optical components may comprise e. g. a polarization alignment device 13, a mode matching telescope 14 and a beam pointing stabilization device 15.

As an example, the enhancement resonator 20 has the bow tie configuration of the first embodiment (FIG. 1). All of the resonator mirrors are provided with adjustment devices, like e. g. piezo electric drives being capable of adjusting the respective mirrors in five degrees of freedom—except the rotational degree of freedom of the mirror axis collinear to the mirror cylinder geometry. As examples, adjustment stages 21.1 and 24.1 are illustrated at the curved focusing mirrors 21 and 24. The adjustment stages at the mirrors 22 and 23 are not shown.

The enhancement resonator 20 is arranged in a gas pressure tight container 40, in particular air pressure tight, being connected with a vacuum pump (not shown) and providing an environment of reduced air pressure. During operation of the laser device 100, a pressure of e. g about $10^{-3}$ Pa to $10^{-4}$ Pa is provided in the container. The air pressure tight container 40 includes wedged windows 41, 42 for input coupling the laser light 2 and output coupling of the interference output signal 4 and e. g. XUV/X-Ray and/or THz radiation 5.1 and/or 5.2, respectively. The first window 41 is made of material being transparent in a wavelength range of the laser light 2, in particular in the wavelength range from UV via visible to IR-wavelengths, e. g. glass or plastic material. The second window 42 is transparent in a wavelength range of the X-Ray or THz radiation generated at the focal position 25 of the enhancement resonator 20. To this end, the second window 42 is made of e. g. beryllium or silicon. In particular with the generation of XUV and soft X-ray radiation, the second window can be replaced by a connection channel opening to a further vacuum device where the XUV or soft X-ray radiation is used for a particular application.

The enhancement resonator 20 is arranged on a mechanical oscillation damping device 50 (schematically illustrated), which preferably comprises an active mechanical oscillation isolation, like a six degree of freedom compensating electromagnetic and/or piezo electric drive with a control system which damps mechanical vibrations by counter propagating the complete enhancement resonator setup relative to the vibration oscillation by about the same amplitude (mechanical oscillation isolation is possible in the range from 0.7 Hz to 200 Hz) or a passive mechanical oscillation absorber.

For generating hard X-ray radiation, a target is supplied by a target source device (not shown) at the focal position 25. In case of an electron bunch as target the electron beam of relativistic electrons is directed from an electron beam source (not shown) to the focal position 25 with a direction opposite to the propagation direction of the intra-resonator pulse 1 within the enhancement resonator. Further details of directing the electron beam to the focal position are described below with reference to FIG. 8. According to the direction of the intra-resonator laser pulse, the XUV/X-Ray radiation 5 is directed out of the container 40 through the second window 42.

The control device 30 comprises an electronic circuitry being configured for controlling the laser source device 10 and the enhancement resonator 20 such that the laser source device 10 is stabilized to the enhancement resonator's 20 length and the carrier-envelope offset frequency of the circulating laser light pulse or to the continuous-wave frequency of the standing-wave inside the enhancement resonator 20 for a coherent addition of the laser light at the IC mirror 21. This is realized by controlling the frequency comb parameters of the laser source device's laser oscillator repetition rate and carrier-envelope offset frequency or continuous-wave frequency, e. g. with a resonator mirror mounted on a linear stage inside the laser oscillator, a resonator mirror mounted on a piezo electric actuator inside the laser oscillator, oscillator pump photon flux control, a pair of fused silica wedges, and with an electro-optic modulator inside the laser oscillator. On the other hand, the adjustment devices (e. g. 21.1 to 24.1) provide a proper enhancement resonator mirror alignment to build up a stable resonator.

Figure 8:
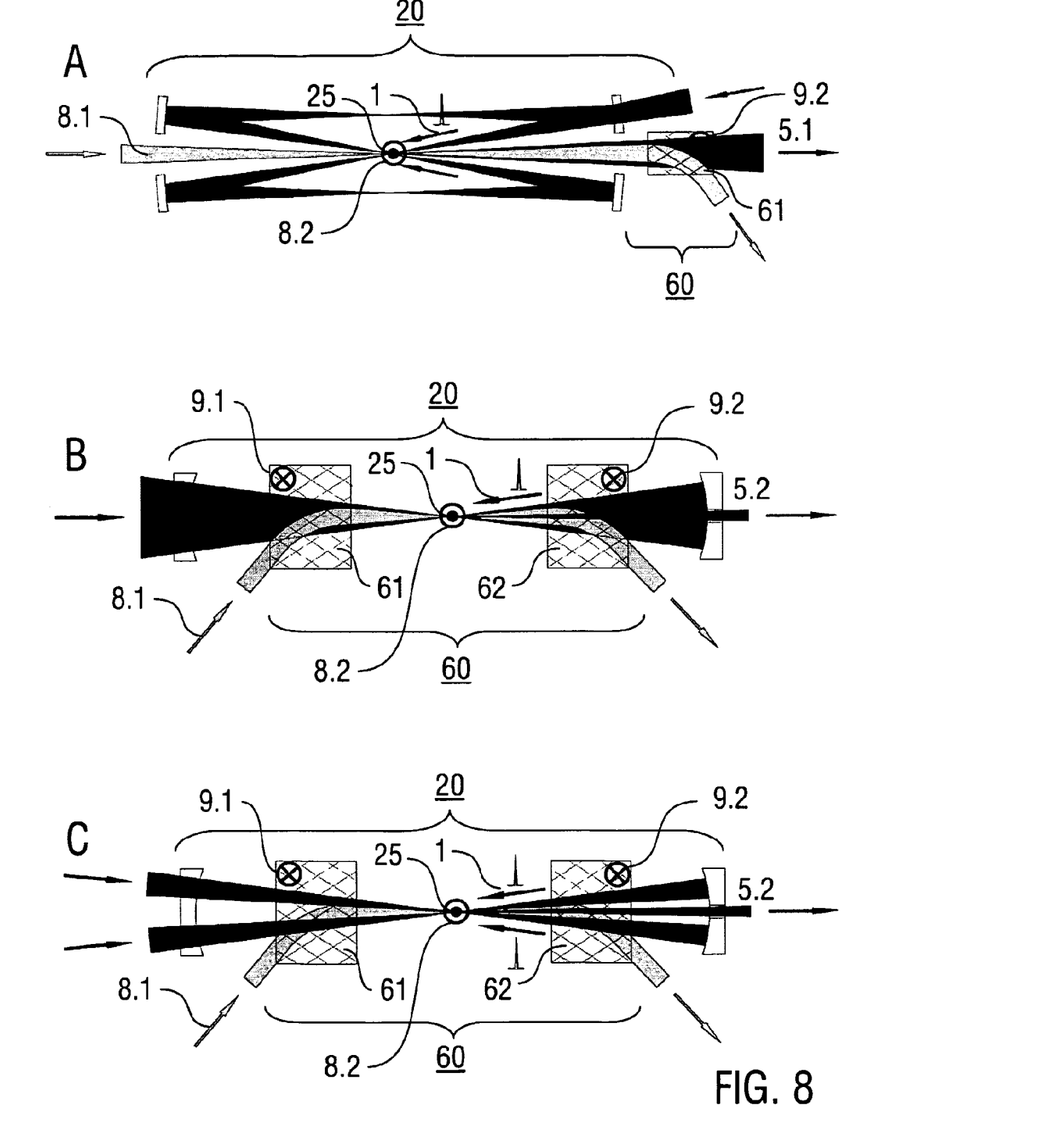
FIGS. 8A-8C: schematic illustrations of the output coupling of radiation through a gap between or a hole inside resonator mirrors and the positions of the intended target beams.

FIG. 8 illustrates the generation of XUV/X-Ray radiation based on an interaction of the at least one circulating intra-resonator laser light pulse with electron bunches of relativistic electrons 8.1 or an atomic or molecular beam 8.2, each either consisting of clustered or non-clustered beam constituents, the later crossing the focal position in perpendicular direction to the plane defined by the enhancement resonator laser light path. With the variant of FIG. 8A (corresponding to the bow-tie configuration of FIG. 1), the electron beam 8.1 is directed from an electron source (not shown) to the focal position 25 with a direction opposite to the propagation direction of the intra-resonator pulse 1 within the enhancement resonator 20. The X-ray radiation 5.1 created by the interaction of the laser light pulses with the electron bunches is coupled out of the enhancement resonator through a gap between or aside the resonator mirrors. A magnetic beam guiding device 60 including magnetic beam guiding coils 61 is provided on the output coupling side of the XUV/X-Ray radiation 5.1 for deflecting the electron beam 8.1 to e. g. a collector or storage ring (not shown). The direction of the magnetic field 9.1 is illustrated by an arrow pointing orthogonal to the plane of the resonator laser light path.

According to the variant of FIG. 8B (corresponding to the standing-wave configuration of FIG. 2), a magnetic beam guiding device 60 including two magnetic beam guiding coils 61 and 62 with magnetic field directions 9.1 and 9.2 is provided, which direct the electron beam 8.1 from an electron source (not shown) to the focal position 25 and after the interaction with the at least one intra-resonator pulse 1 out of the enhancement resonator 20 to e. g. a collector or storage ring (not shown). The XUV/X-Ray radiation 5.2 created by the interaction is coupled out of the enhancement resonator through a hole in at least one of the resonator mirrors. The same electron beam geometry can be implemented with the two beam path embodiment of FIG. 5 as illustrated in FIG. 8C. The use of an atomic or molecular beam 8.2 in the focus is also possible here.

The features of the invention disclosed in the above description, the drawings and the claims can be of significance both individually as well as in combination for the realization of the invention in its various embodiments.

The invention claimed is:

1. A method of generating intra-resonator laser light, comprising the steps of:

coupling input laser light into an enhancement resonator, which comprises at least two curved resonator mirrors and which is free of a laser light amplifying medium, wherein said at least two curved resonator mirrors: (a) are consecutively arranged, (b) span at least one resonator path with a predetermined resonator length, and (c) provide at least two pairs of consecutive curved resonator mirrors which are serially coupled along said at least one resonator path; and coherent addition of the input laser light in the enhancement resonator so that the intra-resonator laser light is formed, wherein: (i) said at least two pairs of consecutive curved resonator mirrors each has a detuned concentric configuration; (ii) the input laser light comprises laser light pulses having a predetermined pulse repetition rate, pulse duration and carrier envelope offset frequency; and (iii) the intra-resonator laser light comprises at least one intra-resonator pulse circulating in the enhancement resonator.

2. The method according to claim 1, wherein an optical light path length of each of the at least two pairs of consecutive curved resonator mirrors is less than a sum of radii of curvature of the consecutive curved resonator mirrors by a predetermined detuning distance.

3. The method according to claim 2, wherein the detuning distance is at least 150 nm.

4. The method according to claim 2, wherein the detuning distance is at least 500 nm.

5. The method according to claim 2, wherein the detuning distance is at most 150 μm.

6. The method according to claim 2, wherein the detuning distance is at most 15 μm.

7. The method according to claim 1, wherein an angle of incidence of the at least one resonator path on the curved resonator mirrors deviates from normal incidence by a detuning angle.

8. The method according to claim 7, wherein the detuning angle is at least 7.5 mrad.

9. The method according to claim 7, wherein the detuning angle is at most 150 mrad.

10. The method according to claim 7, wherein the detuning angle is at most 50 mrad.

11. The method according to claim 1, wherein a $1/e^2$ beam radius of a photon flux density of the intra-resonator laser light on each of the curved resonator mirrors is at least 2 mm.

12. The method according to claim 1, wherein a $1/e^2$ beam radius of a photon flux density of the intra-resonator laser light on each of the curved resonator mirrors is at least 5 mm.

13. The method according to claim 1, wherein the enhancement resonator comprises four pairs of consecutive curved resonator mirrors having a bow tie configuration.

14. The method according to claim 1, wherein the enhancement resonator comprises two pairs of consecutive curved resonator mirrors and at least one plane resonator mirror forming a ring resonator configuration.

15. The method according to claim 14, wherein the coupling step comprises coupling the laser light into the enhancement resonator such that at least two resonator paths are spanned.

16. The method according to claim 1, wherein all the curved resonator mirrors are spherical mirrors.

17. The method according to claim 16, wherein all the curved resonator mirrors are spherical mirrors having equal radii of curvature.

18. The method according to claim 1, wherein the laser light pulses are coherently added to a plurality of N intra-resonator pulses circulating along the at least one resonator path in the enhancement resonator, wherein the laser light pulses are coherently added by controlling the pulse repetition rate and the carrier-envelope offset frequency.

19. The method according to claim 1, comprising at least one of the further steps of:
   actively controlling the resonator length,
   actively controlling a laser source device creating the input laser light,
   actively controlling at least one of an input coupling position and a spatial input coupling direction of the input laser light by beam pointing stabilization, and
   actively or passively isolating the enhancement resonator and a laser source device creating the input laser light from external mechanical oscillations.

20. The method according to claim 2, comprising the further step of actively controlling the detuning distance of said at least two pairs of consecutive curved resonator mirrors.

21. The method according to claim 7, comprising the further step of actively controlling the detuning angle of at least one of the pairs of the curved resonator mirrors consecutively arranged along the at least one resonator path.

22. The method according to claim 1, comprising the further steps of:
   providing a target material or an electron bunch at or nearby at least one focal position between two curved cavity mirrors, and
   subjecting the target material or the electron bunch to an interaction with the intra-resonator laser light at or nearby the at least one focal position.

23. The method according to claim 22, comprising at least one of
   arranging the target material under a predetermined angle relative to an enhancement resonator plane spanned by the at least one resonator path, and
   arranging the electron bunch along the at least one resonator path.

24. The method according to claim 22, comprising the step of output coupling of coherent radiation created by the interaction out of the enhancement resonator or collecting and guiding non-coherent radiation created by the interaction inside the enhancement resonator.

25. The method according to claim 24, wherein the coherent radiation is coupled out of the enhancement resonator by at least one of:
   output coupling through a hole in one of the resonator mirrors,
   output coupling through a gap between or aside two of the resonator mirrors, and
   output coupling by an additional optical element deflecting the coherent radiation from the at least one resonator path.

26. The method according to claim 25, comprising the step of decreasing losses to the intra-resonator laser light by the hole in one of the resonator mirrors by exciting higher-order transverse electromagnetic modes inside the enhancement resonator, where a light field of the intra-resonator laser light has a zero photon flux density in a geometrical center of a mode.

27. The method according to claim 22, wherein the electron bunch is coupled in and out of the enhancement resonator through a gap between or aside two of the resonator curved mirrors using magnetic beam guiding.

28. The method according to claim 24, wherein the non-coherent radiation is collected and guided by an optic unit.

29. An enhancement resonator, configured for generating intra-resonator laser light, comprising at least two curved resonator mirrors being consecutively arranged and spanning at least one resonator path with a predetermined resonator length, said at least one resonator path being free of a laser light amplifying medium, wherein:
   said at least two curved resonator mirrors provide at least two pairs of consecutive curved resonator mirrors which are serially coupled along said at least one resonator path;
   said at least two pairs of consecutive curved resonator mirrors each have a detuned concentric configuration; and
   the enhancement resonator has a traveling wave configuration, which is adapted for circulating intra-resonator laser light comprising at least one intra-resonator pulse.

30. The enhancement resonator according to claim 29, wherein an optical light path length of each of the at least two pairs of consecutive curved resonator mirrors is less than a sum of radii of curvature of the consecutive curved cavity mirrors by a predetermined detuning distance.

31. The enhancement resonator according to claim 29, wherein the detuning distance is at least 150 nm.

32. The enhancement resonator according to claim 29, wherein the detuning distance is at least 1 µm.

33. The enhancement resonator according to claim 29, wherein the detuning distance is at most 150 µm.

34. The enhancement resonator according to claim 29, wherein the detuning distance is at most 15 µm.

35. The enhancement resonator according to claim 29, wherein an angle of incidence of the at least one resonator path on the curved resonator mirrors deviates from normal incidence by a detuning angle.

36. The enhancement resonator according to claim 35, wherein the detuning angle is at least 7.5 mrad.

37. The enhancement resonator according to claim 35, wherein the detuning angle is at most 150 mrad.

38. The enhancement resonator according to claim 35, wherein the detuning angle is at most 50 mrad.

39. The enhancement resonator according to claim 29, wherein the enhancement resonator comprises four pairs of consecutive curved resonator mirrors having a bow tie configuration.

40. The enhancement resonator according to claim 29, wherein the enhancement resonator comprises two pairs of consecutive curved resonator mirrors and at least one plane resonator mirror forming a ring resonator configuration.

41. The enhancement resonator according to claim 29, wherein all the curved resonator mirrors are spherical mirrors.

42. The enhancement resonator according to claim 41, wherein all the curved resonator mirrors are spherical mirrors having equal radii of curvature.

43. The enhancement resonator according to claim 29, further comprising a control device configured for at least one of:
   actively controlling the resonator length,
   actively controlling a laser source device creating the input laser light, and
   actively controlling at least one of an input coupling position and a spatial input coupling direction of the input laser light by beam pointing stabilization.

44. The enhancement resonator according to claim 30, further comprising a control device configured for actively controlling the detuning distance of said at least two pairs of consecutive curved resonator mirrors.

45. The enhancement resonator according to claim 35, further comprising a control device configured for actively controlling the detuning angle of at least one of the pairs of the curved resonator mirrors consecutively arranged along the at least one resonator path.

46. The enhancement resonator according to claim 29, further comprising an oscillation damping device configured for actively or passively isolating the enhancement resonator and a laser source device creating the input laser light from external mechanical oscillations.

47. The enhancement resonator according to claim 29, further comprising a target source device configured for providing a target material at or nearby at least one focal position between two curved cavity mirrors.

48. The enhancement resonator according to claim 47, wherein the target source device is configured for providing electron bunches or atomic clusters at or nearby the at least one focal position between two curved cavity mirrors.

49. The enhancement resonator according to claim 29, further comprising an output coupling device configured for coupling of coherent radiation created by interaction out of the enhancement resonator or collecting and guiding non-coherent radiation created by the interaction inside the enhancement resonator.

50. A laser device, comprising:
a laser source device arranged for providing input laser light, and
an enhancement resonator device including an enhancement resonator according to claim 29,
wherein the laser source device includes a pulse laser generating the input laser light comprising laser light pulses with a predetermined pulse repetition rate, pulse duration and carrier-envelope offset frequency.

51. The laser device according to claim 50, wherein the laser source device is configured for coupling the laser light into the enhancement resonator such that at least two resonator paths are spanned.

* * * * *

UNITED STATES PATENT AND TRADEMARK OFFICE
CERTIFICATE OF CORRECTION

PATENT NO.         : 8,976,834 B2
APPLICATION NO.    : 13/821003
DATED              : March 10, 2015
INVENTOR(S)        : Jan Kaster et al.

It is certified that error appears in the above-identified patent and that said Letters Patent is hereby corrected as shown below:

Title Page item (73), please add the following as a second Assignee:

Ludwig-Maximilians-Universitaet Muenchen, Munich (DE)

Signed and Sealed this
Seventh Day of July, 2015

Michelle K. Lee
*Director of the United States Patent and Trademark Office*